US009417803B2

(12) United States Patent
Sandel et al.

(10) Patent No.: US 9,417,803 B2
(45) Date of Patent: Aug. 16, 2016

(54) ADAPTIVE MAPPING OF LOGICAL ADDRESSES TO MEMORY DEVICES IN SOLID STATE DRIVES

(75) Inventors: Eran Sandel, Holon (IL); Oren Golov, Hasharon (IL)

(73) Assignee: Apple Inc., Cupertino, CA (US)

(*) Notice: Subject to any disclaimer, the term of this patent is extended or adjusted under 35 U.S.C. 154(b) by 358 days.

(21) Appl. No.: 13/535,889

(22) Filed: Jun. 28, 2012

(65) Prior Publication Data

US 2013/0073822 A1    Mar. 21, 2013

Related U.S. Application Data

(60) Provisional application No. 61/536,597, filed on Sep. 20, 2011.

(51) Int. Cl.
*G06F 9/26* (2006.01)
*G06F 9/34* (2006.01)
*G06F 12/00* (2006.01)
*G06F 3/06* (2006.01)
*G06F 11/00* (2006.01)
*G06F 12/02* (2006.01)
*G06F 11/34* (2006.01)

(52) U.S. Cl.
CPC .............. *G06F 3/0616* (2013.01); *G06F 3/064* (2013.01); *G06F 3/0679* (2013.01); *G06F 11/008* (2013.01); *G06F 11/3433* (2013.01); *G06F 12/0246* (2013.01); *G06F 11/3485* (2013.01); *G06F 2201/88* (2013.01); *G06F 2212/7202* (2013.01); *G06F 2212/7208* (2013.01)

(58) Field of Classification Search
CPC .................................................... G06F 3/0616
See application file for complete search history.

(56) References Cited

U.S. PATENT DOCUMENTS 5,430,859 A * 7/1995 Norman et al. ............... 711/103
5,696,925 A * 12/1997 Koh .............................. 711/203

(Continued)

FOREIGN PATENT DOCUMENTS

JP    2006-509304    3/2006
JP    2007-519996    7/2007

(Continued)

OTHER PUBLICATIONS

Demand-based block-level address mapping in large-scale NAND flash storage systems, Qin et al, Proceedings of the eighth IEEE/ACM/IFIP international conference on Hardware/software codesign and system synthesis, Oct. 24, 2010, pp. 173-182 (10 pages).*

(Continued)

*Primary Examiner* — Yong Choe
*Assistant Examiner* — Daniel C Chappell
(74) *Attorney, Agent, or Firm* — Meyertons, Hood, Kivlin, Kowert & Goetzel, P.C.

(57) ABSTRACT

A method for data storage includes receiving data items associated with respective logical addresses for storage in a memory that includes multiple memory units. Respective estimates of a performance characteristic are obtained for the multiple memory units. A mapping, which maps the logical addresses to respective physical storage locations in the multiple memory units, is adapted based on the estimates so as to balance the performance characteristic across the memory units. The data items are stored in the physical storage locations in accordance with the adapted mapping.

21 Claims, 2 Drawing Sheets

(56) References Cited

U.S. PATENT DOCUMENTS

| | | | |
|---|---|---|---|
| 5,737,742 A * | 4/1998 | Achiwa | G06F 12/023 365/189.09 |
| 6,230,233 B1 * | 5/2001 | Lofgren et al. | 711/103 |
| 6,332,178 B1 | 12/2001 | Dean et al. | |
| 7,111,118 B2 | 9/2006 | Mereddy et al. | |
| 7,441,096 B2 * | 10/2008 | Kitamura | 711/203 |
| 7,493,541 B1 | 2/2009 | Agrawal et al. | |
| 7,509,471 B2 * | 3/2009 | Gorobets | G06F 12/0246 711/103 |
| 7,702,845 B2 * | 4/2010 | Shin | G06F 12/0246 711/103 |
| 7,774,556 B2 * | 8/2010 | Karamcheti et al. | 711/146 |
| 7,797,481 B2 * | 9/2010 | Lee et al. | 711/103 |
| 7,849,275 B2 * | 12/2010 | Danilak | G06F 11/008 711/154 |
| 7,861,122 B2 * | 12/2010 | Cornwell et al. | 714/42 |
| 7,948,798 B1 | 5/2011 | Sheredy | |
| 8,006,038 B2 * | 8/2011 | Lionetti | G06F 3/0605 711/118 |
| 8,060,806 B2 * | 11/2011 | Shalvi et al. | 714/763 |
| 8,078,794 B2 * | 12/2011 | Lee | G06F 3/0613 711/103 |
| 8,271,757 B1 * | 9/2012 | Chatterjee et al. | 711/165 |
| 8,275,933 B2 * | 9/2012 | Flynn | G06F 12/0246 711/103 |
| 8,369,141 B2 * | 2/2013 | Sommer et al. | 365/185.03 |
| 8,516,206 B2 * | 8/2013 | Yoshida | G06F 3/0616 100/111 |
| 8,516,218 B2 | 8/2013 | Sauer et al. | |
| 8,555,018 B1 * | 10/2013 | Rohr et al. | 711/165 |
| 8,775,723 B2 * | 7/2014 | Suzuki | G06F 12/0246 711/103 |
| 8,954,689 B2 * | 2/2015 | Seekins | G06F 3/0616 711/154 |
| 9,021,158 B2 * | 4/2015 | Hyun | G11C 16/10 710/15 |
| 9,183,134 B2 * | 11/2015 | Haines | G06F 12/0246 |
| 2005/0055532 A1 * | 3/2005 | Yu | 711/203 |
| 2005/0144368 A1 | 6/2005 | Chung et al. | |
| 2006/0236165 A1 | 10/2006 | Cepulis et al. | |
| 2006/0282644 A1 * | 12/2006 | Wong | 711/206 |
| 2007/0234162 A1 * | 10/2007 | Barth | 714/736 |
| 2007/0260811 A1 * | 11/2007 | Merry et al. | 711/103 |
| 2008/0077729 A1 | 3/2008 | Kim et al. | |
| 2008/0235432 A1 | 9/2008 | Chen | |
| 2009/0049234 A1 * | 2/2009 | Oh | G06F 12/0246 711/103 |
| 2009/0100244 A1 * | 4/2009 | Chang et al. | 711/172 |
| 2009/0150641 A1 | 6/2009 | Flynn et al. | |
| 2009/0172342 A1 * | 7/2009 | Wong | 711/206 |
| 2009/0182791 A1 * | 7/2009 | Gorobets | G06F 12/0246 |
| 2009/0196303 A1 * | 8/2009 | Battle et al. | 370/403 |
| 2009/0210611 A1 | 8/2009 | Mizushima | |
| 2009/0240870 A1 | 9/2009 | Kinoshita | |
| 2009/0265508 A1 * | 10/2009 | Bennett et al. | 711/103 |
| 2010/0122200 A1 * | 5/2010 | Merry et al. | 715/771 |
| 2010/0161928 A1 * | 6/2010 | Sela et al. | 711/163 |
| 2010/0241798 A1 * | 9/2010 | Wong | 711/103 |
| 2011/0022801 A1 | 1/2011 | Flynn | |
| 2011/0087631 A1 * | 4/2011 | Feldman et al. | 707/610 |
| 2011/0153908 A1 | 6/2011 | Schaefer et al. | |
| 2011/0238886 A1 * | 9/2011 | Post et al. | 711/103 |
| 2012/0023351 A1 * | 1/2012 | Wakrat et al. | 713/322 |
| 2012/0151130 A1 * | 6/2012 | Merry et al. | 711/103 |
| 2012/0272038 A1 * | 10/2012 | Wei et al. | 711/206 |
| 2014/0082322 A1 | 3/2014 | Loh et al. | |
| 2014/0082323 A1 | 3/2014 | Li | |
| 2014/0122780 A1 * | 5/2014 | Smith et al. | 711/103 |
| 2016/0034206 A1 * | 2/2016 | Ryan | G11C 16/349 711/103 |

FOREIGN PATENT DOCUMENTS

| | | |
|---|---|---|
| JP | 2009230414 A | 10/2009 |
| JP | 2010-097333 | 4/2010 |
| JP | 2011-138273 | 7/2011 |

OTHER PUBLICATIONS

ADAPT: Efficient workload-sensitive flash management based on adaptation, prediction and aggregation, Wang et al, 2012 IEEE 28th Symposium on Mass Storage Systems and Technologies (MSST), Apr. 16-20, 2012, pp. 1-12 (12 pages).*

Preliminary Report on Patentability from PCT/US2012/056309, mailed Apr. 3, 2014, Apple Inc., pp. 1-8.

International Search Report and Written Opinion in application No. PCT/US 12/56309 mailed Nov. 30, 2012.

Notice of Preliminary Rejection from Korean Application No. 1020147010339, issued Feb. 2, 2015, English and Korean versions, pp. 1-10.

Search Report in European Patent application 12833187.3 issued Mar. 23, 2015.

Notification of Reason(s) for Rejection in Japanese patent application No. 2014-530971 issued Mar. 25, 2015.

Final Office Action, Japanese Application No. 2014-530971, mailed Jul. 27, 2015, 6 pages.

* cited by examiner

US 9,417,803 B2

ADAPTIVE MAPPING OF LOGICAL ADDRESSES TO MEMORY DEVICES IN SOLID STATE DRIVES

CROSS-REFERENCE TO RELATED APPLICATIONS

This application claims the benefit of U.S. Provisional Patent Application 61/536,597, filed Sep. 20, 2011, whose disclosure is incorporated herein by reference.

FIELD OF THE INVENTION

The present invention relates generally to memory devices, and particularly to methods and systems for logical-to-physical address mapping.

BACKGROUND OF THE INVENTION

Data storage in non-volatile memory devices such as Flash devices often involves translating logical addresses into physical storage locations in the memory. Various techniques for mapping logical addresses to physical addresses are known in the art. For example, U.S. Pat. No. 7,631,138, whose disclosure is incorporated herein by reference, describes techniques for adaptive mode switching of Flash memory address mapping based on host usage characteristics. In some embodiments, a controller switches the manner in which data sectors are mapped into blocks and meta-blocks of the memory in response to host programming and controller data consolidation patterns, in order to improve performance and reduce wear.

SUMMARY OF THE INVENTION

An embodiment of the present invention that is described herein provides a method for data storage. The method includes receiving data items associated with respective logical addresses for storage in a memory that includes multiple memory units. Respective estimates of a performance characteristic are obtained for the multiple memory units. A mapping, which maps the logical addresses to respective physical storage locations in the multiple memory units, is adapted based on the estimates so as to balance the performance characteristic across the memory units. The data items are stored in the physical storage locations in accordance with the adapted mapping.

In some embodiments, adapting the mapping includes modifying a total number of the logical addresses that are mapped to a given memory unit. In an embodiment, storing the data items includes distributing the data items among the memory units in accordance with a weighted Round-Robin scheduling scheme that assigns respective weights to the memory units, and adapting the mapping including modifying one or more of the weights. Modifying the weights may include assigning to a given memory unit different first and second weights for respective different first and second types of memory access commands.

In another embodiment, obtaining the estimates includes evaluating the performance characteristic for the multiple memory units during production of the memory or the memory units. Additionally or alternatively, obtaining the estimates may include evaluating the performance characteristic for the multiple memory units while the memory is operating in a host system.

In a disclosed embodiment, adapting the mapping includes initially storing the data items in the memory in accordance with an initial setting of the mapping, and subsequently adapting the mapping and copying one or more of the data items so as to store the data items in the memory in accordance with the adapted mapping.

In various example embodiments, the performance characteristic for each memory unit is indicative of a respective count of memory blocks in the memory unit that are available for programming, of a respective count of faulty memory blocks in the memory unit, of a respective time duration of a memory access command applied to the memory unit, of a respective read error performance of the memory unit, of a respective endurance of the memory unit, of a respective frequency of access to data stored in the memory unit, and/or of a respective count of memory access commands pending for execution in the memory unit.

There is additionally provided, in accordance with an embodiment of the present invention, a data storage apparatus that includes an interface and a processor. The interface is configured to communicate with a memory that includes multiple memory units. The processor is configured to receive data items associated with respective logical addresses for storage in the memory, to obtain respective estimates of a performance characteristic for the multiple memory units, to adapt, based on the estimates, a mapping that maps the logical addresses to respective physical storage locations in the multiple memory units, so as to balance the performance characteristic across the memory units, and to store the data items in the physical storage locations in accordance with the adapted mapping.

There is also provided, in accordance with an embodiment of the present invention, a data storage apparatus that includes a memory and a processor. The memory includes multiple memory units. The processor is configured to receive data items associated with respective logical addresses for storage in the memory, to obtain respective estimates of a performance characteristic for the multiple memory units, to adapt, based on the estimates, a mapping that maps the logical addresses to respective physical storage locations in the multiple memory units, so as to balance the performance characteristic across the memory units, and to store the data items in the physical storage locations in accordance with the adapted mapping.

The present invention will be more fully understood from the following detailed description of the embodiments thereof, taken together with the drawings in which:

DETAILED DESCRIPTION OF EMBODIMENTS

Overview

Some types of memory devices are constructed from multiple memory units. For example, a Solid State Drive (SSD) typically comprises multiple non-volatile memory dies such as Flash dies. In many practical scenarios, memory units in a given memory device may differ from one another in characteristics such as the number of free memory blocks, the number of bad blocks, memory access latency, error performance, expected endurance, the presence of frequently-used vs.

rarely-used data, and/or the number of commands that are currently pending for execution. Some of the differences may already be present when the memory units are produced, and some may develop during the lifetime of the memory device in a host system.

Embodiments of the present invention that are described herein provide improved methods and systems for data storage. The disclosed techniques distribute data for storage in the multiple memory units based on estimated characteristics of the individual memory units.

In a typical flow, a memory controller or other processor estimates one or more characteristics of each memory unit, such as the example characteristics listed above. The processor distributes incoming data for storage in the various memory units in a manner that balances the characteristics across the memory device.

For example, the processor may adapt a Virtual-to-Physical (V-P) address mapping, which translates virtual addresses associated with the data into physical storage locations in the memory units, based on the estimated memory unit characteristics. In other words, the processor may adapt the assignment of Logical Block Addresses (LBAs) to memory units based on the estimated characteristics. Adapting the V-P mapping in this manner enables the processor to balance characteristics such as lifetime, storage latency or error performance across the memory device.

It is possible in principle to define the V-P mapping, either statically or adaptively, without considering the memory unit characteristics. Such a solution, however, is likely to cause the worst-performing memory units to dominate the overall performance of the memory device. By contrast, the disclosed techniques adapt the V-P mapping to the actual individual characteristics of each memory unit, resulting in better overall memory device performance.

System Description

Figure 1:
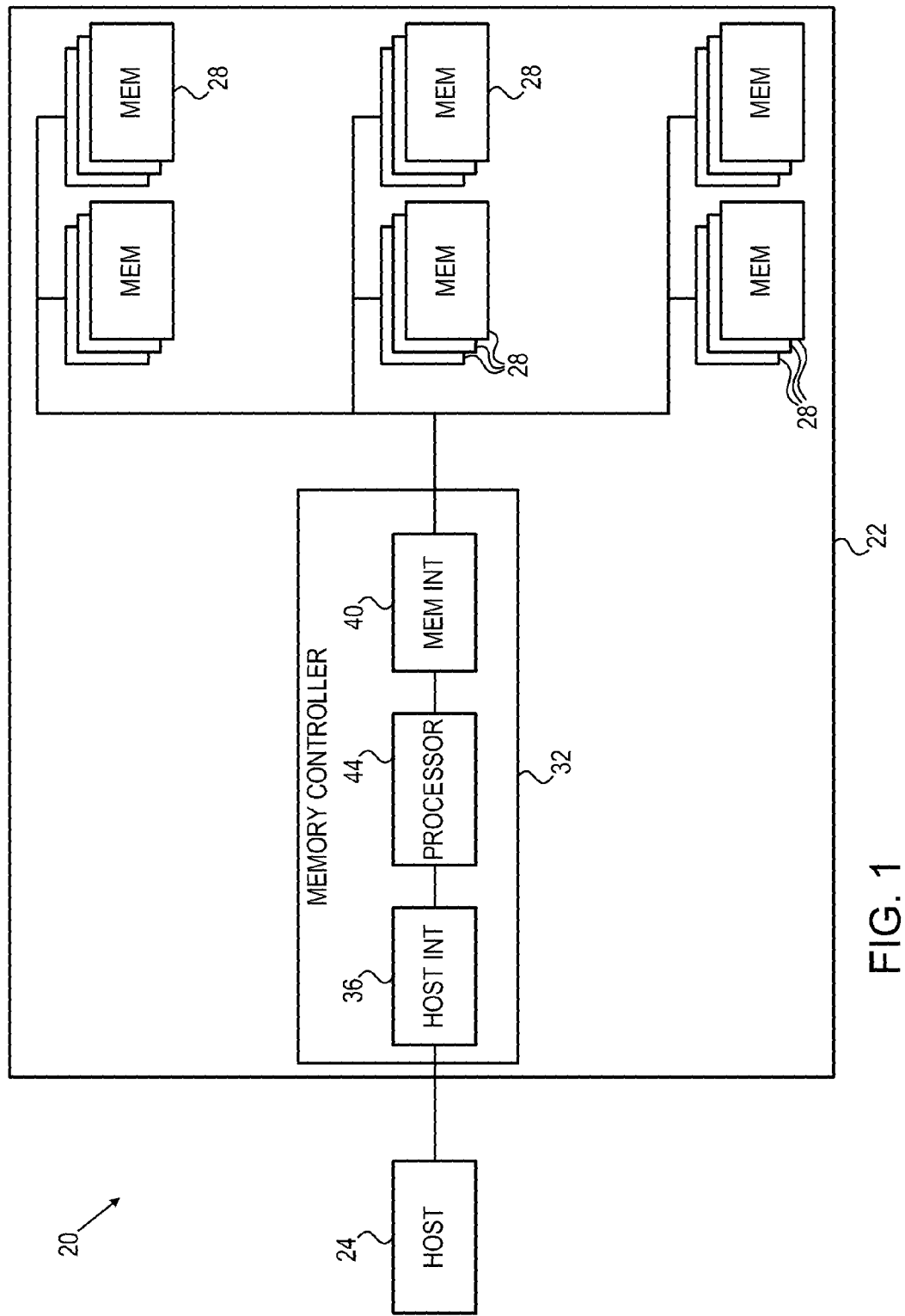
FIG. 1 is a block diagram that schematically illustrates a data storage system, in accordance with an embodiment of the present invention.

FIG. 1 is a block diagram that schematically illustrates a data storage system 20, in accordance with an embodiment of the present invention. System 20 comprises a memory device 22 and a host 24. Memory device 22 accepts data for storage from host 24 and stores it in memory, and retrieves data from memory and provides it to the host.

In various embodiments, memory device 22 may comprise, for example, a Solid State Drive (SSD) that stores data for a personal or mobile computing device or an enterprise system, or a Micro-Secure Digital (μSD) card that stores data for a cellular phone, media player, digital camera or other host. In alternative embodiments, memory device 22 may be used in any other suitable application in which data is stored and retrieved and with any other suitable host.

Memory device 22 comprises multiple memory units 28. In the present example, each memory unit 28 comprises a respective Flash die that comprises multiple non-volatile analog memory cells. The terms "memory unit" and "die" are thus used interchangeably herein. The memory cells may comprise, for example, NAND Flash cells, NOR or Charge Trap Flash (CTF) Flash cells, phase change RAM (PRAM, also referred to as Phase Change Memory—PCM) cells, Nitride Read Only Memory (NROM) cells, Ferroelectric RAM (FRAM) and/or magnetic RAM (MRAM) cells, or any other suitable memory technology.

In the context of the present patent application and in the claims, the term "analog memory cell" is used to describe any memory cell that holds a continuous, analog value of a physical parameter, such as an electrical voltage or charge. Any suitable type of analog memory cells, such as the types listed above, can be used. In the present example, each memory unit 28 comprises a non-volatile memory of NAND Flash cells. The charge levels stored in the cells and/or the analog voltages or currents written into and read out of the cells are referred to herein collectively as analog values or storage values.

Memory device 22 stores data in the analog memory cells by programming the cells to assume respective memory states, which are also referred to as programming levels. The programming levels are selected from a finite set of possible levels, and each level corresponds to a certain nominal storage value. For example, a 2 bit/cell MLC can be programmed to assume one of four possible programming levels by writing one of four possible nominal storage values into the cell. The memory cells are typically arranged in rows and columns. Typically, a given memory unit comprises multiple erasure blocks (also referred to as memory blocks), i.e., groups of memory cells that are erased together.

In various embodiments, each memory unit 28 may comprise a packaged device or an unpackaged semiconductor chip or die. Generally, memory device 22 may comprise any suitable number of memory devices of any desired type and size.

Memory device 22 comprises a memory controller 32, which accepts data from host 24 and stores it in memory units 28, and retrieves data from the memory units and provides it to the host. Memory controller 32 comprises a host interface 36 for communicating with host 24, a memory interface 40 for communicating with memory units 28, and a processor 44 that processes the stored and retrieved data. For example, processor 44 may encode the data for storage with an Error Correction Code (ECC) and decode the ECC of data read from memory. The functions of processor 44 can be implemented, for example, using software running on a suitable Central Processing Unit (CPU), using hardware (e.g., state machine or other logic), or using a combination of software and hardware elements.

Memory controller 32, and in particular processor 44, may be implemented in hardware. Alternatively, the memory controller may comprise a microprocessor that runs suitable software, or a combination of hardware and software elements. In some embodiments, processor 44 comprises a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

The system configuration of FIG. 1 is an example configuration, which is shown purely for the sake of conceptual clarity. Any other suitable memory system configuration can also be used. For example, in some embodiments two or more memory controllers 32 may be connected to the same host. Elements that are not necessary for understanding the principles of the present invention, such as various interfaces, addressing circuits, timing and sequencing circuits and debugging circuits, have been omitted from the figure for clarity.

In the exemplary system configuration shown in FIG. 1, memory units 28 and memory controller 32 are implemented as separate Integrated Circuits (ICs). In alternative embodiments, however, the memory units and the memory controller may be integrated on separate semiconductor dies in a single Multi-Chip Package (MCP) or System on Chip (SoC), and may be interconnected by an internal bus. Further alternatively, some or all of the memory controller circuitry may reside on the same die on which one or more of the memory units are disposed. Further alternatively, some or all of the functionality of memory controller 32 can be implemented in software and carried out by host 24, or by any other type of memory controller. In some embodiments, host 24 and Memory controller 32 may be fabricated on the same die, or on separate dies in the same device package.

Assignment of Logical Addresses to NAND Dies Based on Estimated Die Characteristics In memory device 22, memory controller 32 writes data to memory units 28 in page units, but erasure is applied to entire memory blocks. Data is written only to erased pages, and it is therefore not possible to update data in-place. Because of this property of Flash memory, processor 44 of memory controller 32 typically applies a Virtual-to-Physical (V-P) address mapping scheme. When using V-P mapping, data items for storage are received from host 24 with respective virtual addresses, also referred to as Logical Block Addresses (LBAs). Processor 44 translates the virtual addresses into respective physical storage locations in memory units 28 in which the data is to be stored.

Updating a data item thus involves writing the updated data item to another physical storage location, marking the previous version of the data as invalid, and dynamically updating the V-P address mapping to indicate the new physical storage location of the data item.

In some embodiments, processor 44 estimates certain characteristics of the individual Flash dies 28, and adapts the V-P address mapping based on the estimated characteristics. Typically, processor 44 adapts the V-P mapping so as to balance the characteristic across the multiple dies.

The following list gives several examples of characteristics that processor 44 may estimate for each die 28. The list also gives the rationale for balancing each characteristic by adapting the V-P mapping:

The number of memory blocks in the die that are erased and available for new programming. It is typically desirable to have a similar number of free blocks in each die. This sort of balancing enables the memory controller to maximize parallelism in storing and retrieval of data in dies 28.

The number of faulty memory blocks ("bad blocks"). Faulty blocks may be identified and marked as bad during production or during use in a host system. Bad blocks reduce the memory device's over-provisioning and may eventually cause data loss. It is desirable to balance the number of bad blocks per die to maximize parallelism. Moreover, dies having a large number of bad blocks can be used less frequently or even ignored altogether.

The time duration needed to perform a memory access command of a given type in the die (e.g., program, read or erase command). Distributing the memory access operations based on the differences in execution time in the various dies can help reduce the overall storage latency. For example, frequently-accessed data can be written to faster dies and rarely-accessed data to slower dies.

Error performance of the die, e.g., the number of errors corrected in readout of data from the die. Distributing the memory access operations based on the differences in error performance of the various dies can help reduce the overall error probability. Balancing of this sort can also reduce management overhead, since error-prone dies typically incur high management overhead on the memory controller.

Endurance estimation of the die, e.g., the expected number of Programming and Erasure (P/E) remaining until the die reaches its end-of-life. Endurance can be quantified as the maximum or average endurance, and can be estimated either during production and/or along the lifetime of the memory device's use in a host system. Balancing the expected endurance of the various dies improves the overall endurance of the memory device.

The presence of frequently-used ("hot") and/or rarely-used ("cold") data in the die. Balancing this characteristic can reduce latency and improve user experience.

The number of memory access commands that are currently pending for execution in the die. Balancing this characteristic, for example by giving preference to less busy dies, can increase parallelism and reduce the overall latency of the memory device.

The characteristics and balancing criteria listed above are chosen purely by way of example. In alternative embodiments, processor 44 may adapt the V-P mapping based on any other suitable die characteristic. In some embodiments, processor 44 estimates multiple different characteristics for each die, and adapts the V-P mapping based on the combination of estimates.

Each of the characteristics can be estimated either during production of dies 28 or of memory device 22, in which case processor 44 may accept information regarding the estimates from an external source. Additionally or alternatively, processor 44 may estimate or re-estimate a given characteristic during operation of memory device 22 in the host system. For example, processor 44 may accept initial estimates of the expected endurance of each die from production testing, and re-estimate the endurance during operation of the memory device in the host system. A similar process can be performed for the number of bad blocks.

In various embodiments, processor 44 may adapt the V-P mapping in different ways. In an example embodiment, processor 44 maps LBAs to physical storage locations using a weighted Round-Robin scheduling scheme. In such a process, processor 44 alternates among memory units 28 in a cyclical manner. At any given point in time, one of the memory units is selected as the next memory unit for storing the next incoming data item, in accordance with the cyclic alternation order. Upon receiving a data item for storage, processor 44 maps the logical address of the data item to a physical storage location in the currently-selected memory unit.

When using a weighted Round-Robin scheme, processor 44 assigns a respective weight to each memory unit 28. The weight defines the relative frequency with which data will be stored in that memory unit in the cyclic alternation order. For example, if the weight of one memory unit is twice the weight of another memory unit, processor 44 will typically store in the former memory unit twice the amount of data that in the latter memory unit.

In some embodiments, processor 44 adapts the V-P mapping (based on the estimated die characteristics) by adapting the weights used in the weighted Round-Robin scheme. Typically, a memory unit that is to store data items at a higher frequency (e.g., because it has a high expected endurance or a small number of bad blocks) will be assigned a high weight, and vice versa. Processor 44 may modify the weights over time, to track variations in the memory unit characteristics. In some embodiments, processor 44 uses different weights for different memory access operations. In an example embodiment, processor 44 assigns different weights for different usage patterns, e.g., one set of weights for random storage and another set of weights for sequential storage.

Figure 2:
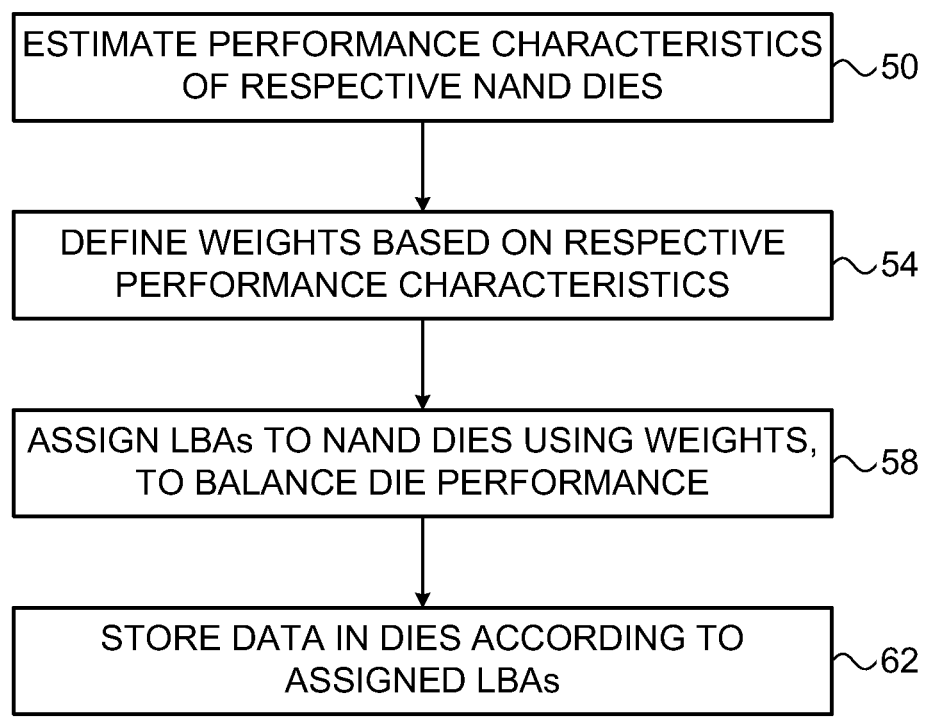
FIG. 2 is a flow chart that schematically illustrates a method for logical-to-physical address mapping, in accordance with an embodiment of the present invention.

FIG. 2 is a flow chart that schematically illustrates a method for logical-to-physical address mapping, in accordance with an embodiment of the present invention. The method begins with processor 44 of memory controller 32 estimating respective characteristics of memory dies 28, at a characteristic estimation step 50.

Based on the estimated die characteristics, processor 44 defines respective weights for dies 28, to be used in the Round-Robin scheduling scheme, at a weight assignment step 54. Processor 44 maps logical addresses of incoming data items to respective physical locations based on the weights, at a mapping step 58. In other words, processor 44 maps LBAs to dies 28 in a weighted Round-Robin scheduling scheme, in which the weights are determined based on the estimated die characteristics. Processor 44 stores the data items in dies 28 in accordance with the mapping, at a storage step 62.

In alternative embodiments, processor 44 may adapt and apply the V-P mapping in any other suitable way, not necessarily involving Round-Robin scheduling.

In some embodiments, processor 44 adapts the V-P mapping in real time to data items that are received for storage. In these embodiments, processor 44 stores each data item that is accepted from host 24 in accordance with the adapted mapping.

In alternative embodiments, processor 44 adapts the V-P mapping in an off-line background process. In these embodiments, processor 44 initially stores the incoming data items in accordance with an initial setting of the V-P mapping, and later adapts the V-P mapping and copies at least some of the data items to alternative physical storage locations in accordance with the adapted V-P mapping.

In an example embodiment, processor 44 initially stores the incoming data items in accordance with a V-P mapping that optimizes write latency, e.g., a mapping that is based on the average programming time of each memory die 28. Later, processor 44 modifies the V-P mapping to optimize readout latency, e.g., to a mapping that is based on the average readout time of each memory die 28. This background technique optimizes both programming and readout latency.

Although the embodiments described herein mainly address Flash dies, the methods and systems described herein can also be used for adapting the V-P mapping based on characteristics of other suitable memory units of any desired size, such as packaged devices, or groups of blocks (e.g., memory planes) within the dies.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data storage, comprising:
    receiving data items associated with respective logical addresses for storage in a memory that includes multiple memory units;
    obtaining respective estimates of performance characteristics for the multiple memory units, wherein the performance characteristics for each memory unit include an indication of a respective count of memory blocks in the memory unit that are available for programming and further include a respective time duration of a memory access command applied to each memory unit;
    based on the estimates, adapting, by a processor, a mapping that maps the logical addresses to respective physical storage locations in the multiple memory units, thereby balancing the performance characteristics across the memory units, wherein balancing the performance characteristics includes writing frequently accessed data to faster memory units and rarely accessed data to slower memory units as determined by the respective time duration of memory access commands applied to each memory unit; and
    storing the data items in the physical storage locations in accordance with the adapted mapping, wherein storing the data items comprises distributing the data items among the memory units in accordance with a weighted Round-Robin scheduling scheme that assigns respective weights to the memory units, and wherein adapting the mapping comprises modifying one or more of the weights, wherein modifying the weights comprises assigning, to a given memory unit, different first and second weights for respective different first and second types of memory access commands, the types of memory access commands including read, write, and erase commands.

2. The method according to claim 1, wherein adapting the mapping comprises modifying a total number of the logical addresses that are mapped to a given memory unit.

3. The method according to claim 1, wherein obtaining the estimates comprises evaluating the performance characteristic for the multiple memory units during production of the memory or the memory units.

4. The method according to claim 1, wherein obtaining the estimates comprises evaluating the performance characteristic for the multiple memory units while the memory is operating in a host system.

5. The method according to claim 1, wherein adapting the mapping comprises initially storing the data items in the memory in accordance with an initial setting of the mapping, and subsequently adapting the mapping and copying one or more of the data items so as to store the data items in the memory in accordance with the adapted mapping.

6. The method according to claim 1, wherein the performance characteristics for each memory unit include indications of a respective count of faulty memory blocks in that memory unit.

7. The method according to claim 1, wherein the performance characteristics for each memory unit include an indication of a respective read error performance of that memory unit.

8. The method according to claim 1, wherein the performance characteristics for each memory unit include an indication of a respective endurance of that memory unit.

9. The method according to claim 1, wherein the performance characteristics for each memory unit include an indication of a respective frequency of access to data stored in each memory unit.

10. The method according to claim 1, wherein the performance characteristics for each memory unit include an indication of a respective count of memory access commands pending for execution in that memory unit.

11. A data storage apparatus, comprising:
a memory interface configured to communicate with a memory that includes multiple memory units; and
a processor coupled to the interface and configured to:
receive data items associated with respective logical addresses for storage in the memory;
obtain respective estimates of performance characteristics for the multiple memory units, wherein the performance characteristics for each memory unit include an indication of a respective count of memory blocks in the memory unit that are available for programming and further include a respective time duration of a memory access command applied to each memory unit;
adapt, based on the estimates, a mapping that maps the logical addresses to respective physical storage locations in the multiple memory units, thereby balancing the performance characteristics across the memory units, wherein balancing the performance characteristics includes writing frequently accessed data to faster memory units and rarely accessed data to slower memory units as determined by the respective time duration of memory access commands applied to each memory unit; and
store the data items in the physical storage locations in accordance with the adapted mapping, wherein storing the data items comprises the processor distributing the data items among the memory units in accordance with a weighted Round-Robin scheduling scheme that assigns respective weights to the memory units and adapting the mapping by modifying one or more of the weights, wherein the processor is configured to assign, to a given memory unit, different first and second weights for respective different first and second types of memory access commands, the types of memory access commands including read, write, and erase commands.

12. The apparatus according to claim 11, wherein the processor is configured to adapt the mapping by modifying a total number of the logical addresses that are mapped to a given memory unit.

13. The apparatus according to claim 11, wherein the processor is configured to accept an evaluation of the performance characteristic for the multiple memory units, which was performed during production of the memory or the memory units.

14. The apparatus according to claim 11, wherein the processor is configured to evaluate the performance characteristic for the multiple memory units while the memory is operating in a host system.

15. The apparatus according to claim 11, wherein the processor is configured to initially store the data items in the memory in accordance with an initial setting of the mapping, and to subsequently adapt the mapping and copy one or more of the data items so as to store the data items in the memory in accordance with the adapted mapping.

16. The apparatus according to claim 11, wherein the performance characteristics for each memory unit include indications of a respective count of faulty memory blocks in that memory unit.

17. The apparatus according to claim 11, wherein the performance characteristics for each memory unit include an indication of a respective read error performance of that memory unit.

18. The apparatus according to claim 11, wherein the performance characteristics for each memory unit are indicative of a respective endurance of that memory unit.

19. The apparatus according to claim 11, wherein the performance characteristics for each memory unit include an indication of a respective frequency of access to data stored in that memory unit.

20. The apparatus according to claim 11, wherein the performance characteristics for each memory unit include an indication of a respective count of memory access commands pending for execution in that memory unit.

21. A data storage apparatus, comprising:
a memory comprising multiple memory units; and
a processor coupled to the memory via a memory interface and configured to:
receive data items associated with respective logical addresses for storage in the memory;
obtain respective estimates of performance characteristics for the multiple memory units, wherein the performance characteristics for each memory unit include an indication of a respective count of memory blocks in that memory unit that are available for programming and further include a respective time duration of a memory access command applied to each memory unit;
adapt, based on the estimates, a mapping that maps the logical addresses to respective physical storage locations in the multiple memory units, thereby balancing the performance characteristics across the memory units, wherein balancing the performance characteristics includes writing frequently accessed data to faster memory units and rarely accessed data to slower memory units as determined by the respective time duration of memory access commands applied to each memory unit; and
store the data items in the physical storage locations in accordance with the adapted mapping, wherein storing the data items comprises the processor distributing the data items among the memory units in accordance with a weighted Round-Robin scheduling scheme that assigns respective weights to the memory units and adapting the mapping by modifying one or more of the weights, wherein the processor is configured to assign, to a given memory unit, different first and second weights for respective different first and second types of memory access commands, the types of memory access commands including read, write, and erase commands.

* * * * *